US006666134B2

(12) United States Patent
Gusching et al.

(10) Patent No.: US 6,666,134 B2
(45) Date of Patent: Dec. 23, 2003

(54) METHOD AND APPARATUS FOR ADJUSTING THE GIB-SLIDE CLEARANCE USING A THERMAL TREATMENT PROCESS

(75) Inventors: Jim Gusching, New Bremen, OH (US); John B. Bornhorst, New Bremen, OH (US)

(73) Assignee: The Minster Machine Company, Minster, OH (US)

(*) Notice: Subject to any disclaimer, the term of this patent is extended or adjusted under 35 U.S.C. 154(b) by 0 days.

(21) Appl. No.: 10/151,508

(22) Filed: May 20, 2002

(65) Prior Publication Data

US 2003/0010086 A1 Jan. 16, 2003

Related U.S. Application Data

(60) Provisional application No. 60/292,728, filed on May 22, 2001.

(51) Int. Cl.[7] .......................... B30B 15/34; B30B 1/00; F16C 33/02

(52) U.S. Cl. .......................... 100/38; 100/48; 100/214; 100/257; 384/39; 384/40

(58) Field of Search .......................... 100/38, 214, 257, 100/99, 48; 72/446, 448, 455, 456; 384/8, 9, 22, 24, 39, 40

(56) References Cited

U.S. PATENT DOCUMENTS 2,582,889 A 1/1952 Sedgwick
3,675,976 A 7/1972 Carrieri et al.
4,161,342 A * 7/1979 Nelsen ........................ 384/57
4,397,232 A * 8/1983 Schockman et al. ........ 100/214
4,502,379 A 3/1985 Sato
4,794,781 A 1/1989 Shiga et al.
5,285,722 A 2/1994 Schockman
5,775,212 A * 7/1998 Takao ......................... 100/214
5,909,705 A * 6/1999 Short et al. ................ 100/214

* cited by examiner

*Primary Examiner*—Allen Ostrager
*Assistant Examiner*—Jimmy T Nguyen
(74) *Attorney, Agent, or Firm*—Randall J. Knuth

(57) ABSTRACT

A feedback control system for use in a press machine is adapted to monitor and adjust the clearance between the gib and slide. A connection bolt provides a connection between the gib and frame upright. A thermal applicator selectively heats and/or cools the connection bolt to induce a controlled deformation of the bolt, namely, an expansion and/or contraction, respectively. In one form, a heat-induced elongation of the bolt along its longitudinal dimension actuates a corresponding displacement of the gib towards the slide to regulate the spatial relationship therebetween. A sensor provides a measure of any possible clearance between the gib and slide. The clearance measurement is compared to allowable reference clearance data. A controller controls the heating and/or cooling action in accordance with the comparison results, thereby controllably moving the gib. The gib may be selectively displaced to optionally effectuate a partial or full close-out of the existing clearance.

31 Claims, 4 Drawing Sheets

METHOD AND APPARATUS FOR ADJUSTING THE GIB-SLIDE CLEARANCE USING A THERMAL TREATMENT PROCESS

CROSS REFERENCE TO RELATED APPLICATIONS

This application is based upon U.S. Provisional Patent Application Ser. No. 60/292,728, filed May 22, 2001, upon which priority has been claimed.

BACKGROUND OF THE INVENTION

1. Field of the Invention

The present invention relates to a press machine environment, and, more particularly, to a system for monitoring the gib-slide interface to detect the presence of a clearance therebetween and to initiate a procedure for adjusting the clearance in a controlled manner, using a process that thermally conditions the connection elements which connect the gib to the frame uprights.

2. Description of the Related Art

Mechanical presses of the type performing stamping and drawing operations have a conventional construction comprising a crown and a bed portion configured within a frame structure. A slide supported within the frame is adapted for reciprocating movement toward and away from the bed. The slide is driven by a crankshaft having a connecting arm coupled to the slide. These mechanical presses are widely used for a variety of workpiece operations employing a diverse array of die sets, with the press machine varying substantially in size and available tonnage depending upon its intended use.

In a conventional arrangement, the frame structure is formed and/or integrated with a gib apparatus having a known function and configuration. For example, in a typical machine configuration, the frame includes a set of upright support members (e.g., four) extending between the crown and bed at respective corner locations. Transverse cross-beams are used to provide a connection between a pair of same-side uprights. At the upper portion of each upright, a gib member is employed in a known manner to provide guidance-type bearing support to the slide. For example, the gib member includes an engagement surface that is adapted for full surface-to-surface abutting contact with a corresponding surface on the slide or a coupling piece secured to the slide.

In one gib configuration, the individual gib members are mounted to a respective upright. Although designed as stationary structures, the uprights may nevertheless experience an undesirable bending or outward bowing under certain conditions. For example, this bending may occur at the upper ends of the uprights as the crown expands in response to certain thermal conditions within the machine environment, such as significant variations or increases in temperature. These environmental factors are difficult to avoid and/or overcome because press operations inevitably involve a dynamic confluence of extremely high pressures and temperatures that make it difficult to isolate individual machine components from their effects, particularly with respect to a component as massive as the press crown.

The significance of this bending behavior of the upright is seen in the fact that the attached gib member will move in concert with the upright. In particular, any deflection of the upright causes a simultaneous displacement of the attached gib member, which necessarily rearranges the precise spatial relationship between the gib and slide. Under conditions where the upright bows outwardly (i.e., away from the slide), the concurrent movement of the gib will cause a spatial separation or clearance to develop at the interface between the gib and slide, where previously these components were in abutting engagement with one another in a bearing support relationship.

The absence or diminution in the bearing support provided by the gib to the slide can present various problems. For example, if the slide is inadequately supported, as may arise when certain gib elements experience movement creating an unbalanced support configuration, the slide may deviate from its planned course of travel as it reciprocates between the crown and bed. Malfunctions or misalignments involving the slide can lead to press failure and die damage.

SUMMARY OF THE INVENTION

An adjustment mechanism for use in a press machine environment is used to vary the spatial relationship between the slide and gib member mounted to the press upright. Adjustment of the gib-slide clearance is part of a compensation scheme aimed at (in one embodiment) counteracting the bowed condition of the uprights that may arise from thermal expansion or contraction of the crown portion, causing the clearance between the gib and slide to increase or decrease.

In one form of the invention, the connection bolts that attach the gib to the press upright are adapted for use in combination with an apparatus to thermally condition the bolts. In particular, the thermal process involves selectively heating and/or cooling the bolts in a manner sufficient to induce a corresponding deformation of the bolt, namely, expansion or contraction of the bolt dimensions, respectively. This modification of the bolt geometry has the effect of varying the clearance between the gib and upright, which in turn controls the clearance between the gib and slide.

A sensor is provided to measure a clearance between the gib and slide. A determination is made regarding whether this clearance measurement has exceeded an allowable threshold value. In response to an out-of-bounds determination, a controller is programmed, for example, to induce a suitable expansion of the bolt by directing a fluid flow into sufficient contact with the bolt. The fluid temperature and the extent of fluid immersion experienced by the bolt are tailored to cause an expansion or change of the bolt.

This expansion activity is sufficient to effectuate a desired inward displacement of the gib toward the slide (e.g., via elastic bending of the gib). This gib movement counteracts the prior displacement of the gib resulting from a bow in the upright. The clearance between the gib and slide is therefore substantially restored to a normal condition, e.g., a full close-out. In one form, the thermally-induced bolt expansion is manifested as a change in the longitudinal dimension of the bolt, i.e., axial elongation.

The adjustment mechanism preferably forms part of an automated closed-loop feedback system that dynamically and continuously monitors the gib-slide clearance and appropriately regulates the thermal variations in the connection bolt in accordance with a comparison of the clearance measurement to allowable data values. Adjustment of the gib clearance preferably occurs during a running press cycle.

In another form, an adjustment mechanism comprises, in combination, a deformable, thermally-sensitive connection element that provides a connection between a press upright and a gib member. The connection element, in response to changes in its thermal state, experiences a corresponding deformation that actuatively induces a displacement (e.g., elastic deformation) of the gib sufficient to close-out or reduce the clearance between the gib and slide.

The mechanism further includes a sensor to measure the gib-slide clearance, and a controller to vary the thermal state of the connection element according to the sensor clearance measurement. The system preferably defines an automated, closed-loop feedback configuration offering dynamic and continuous monitoring and adjustment of the gib-slide clearance.

As used herein, thermal activity and other such equivalents referenced herein should be considered as encompassing any treatment, conditioning, or other such process that alters, modifies, or otherwise changes a spatial feature or characteristic of the affected element. In one form, the thermal activity will induce such spatial variation by changing a thermal property of the element, such as temperature. This thermal activity should be understood as including a mechanism both for cooling and heating the target material, i.e., the gib-upright connection element.

In one form, the cooling and heating function may be accomplished using a single fluid source that alternately acts as a coolant and a heating agent depending upon the application. In particular, if a connection bolt is specified for expansion, the bolt will be immersed or otherwise brought into contact with fluid having a temperature above that of the bolt. For this purpose, a temperature sensor may be provided to monitor the temperature of the bolt and generate a temperature measurement that is used by the controller to determine the temperature of the fluid needed to facilitate the desired thermal variation.

The invention, in another form thereof, is directed to an apparatus for use in a press machine having a slide, a gib, and a frame. The apparatus comprises, in combination, a connection assembly including at least one connection mechanism, each connection mechanism providing a connection between the gib and the frame; and a module to selectively heat and/or cool at least a portion of at least one connection mechanism. The connection mechanism comprises a fastener, such as, for example at least one of a bolt, a screw, and a tie rod nut combination.

In one form, each connection mechanism has a thermally-sensitive deformation characteristic enabling the connection mechanism to exhibit at least one of expansion and contraction in response to experiencing a heating influence and a cooling influence, respectively.

In one form, the module includes a fluid supply apparatus disposed in operative fluid communication with at least one connection mechanism.

The apparatus, in one form, further includes a sensor to provide a measure of the spatial relationship between the gib and the slide; and a controller operatively connected to the sensor and operatively connected to the module. In a preferred form, the connection assembly, the module, the sensor, and the controller cooperatively define a feedback configuration.

The invention, in another form thereof, is directed to a system for use in a press machine having a slide, a gib, and a frame. The system comprises, in combination, a connection assembly including at least one connection element, each connection element providing a connection between the gib and the frame, and a control system operatively associated with the connection assembly. The control system is adapted to selectively induce the deformation of at least one connection element. In one form, the selective deformation activity is suitable to effectuate a selective change in the spatial relationship between the gib and the slide.

In one form, the control system further includes a fluid supply apparatus disposed in operative fluid communication with at least one connection element.

In one form, each connection element comprises at least one of a bolt, a screw, and a tie rod nut combination.

In one form, the control system further includes an apparatus to selectively heat and/or cool at least a portion of at least one connection element.

The control system, in another form, further comprises a sensor to provide a measure of the spatial relationship between the gib and at least one of the frame and the slide; and a controller to control the operation of the heating/cooling apparatus, using the spatial measurement provided by the sensor. The spatial measurement provided by the sensor preferably defines a possible clearance between the gib and the slide.

In a preferred form, the deformation activity affecting a connection element occurs in response to the influence of a thermal treatment process being carried out under the direction of the control system.

The invention, in another form thereof, is directed to a press comprising, in combination, a crown and a bed; a movable slide disposed for operative movement in opposed relation to the bed; a frame to guide operative movement of the slide; and a gib having at least one gib member. The press further includes a connection assembly comprising at least one connection element, each connection element providing a connection between the frame and a respective gib member. The press further includes a control system configured to selectively heat and/or cool at least a portion of at least one connection element.

In one form, the selective heating and/or cooling activity provided by the control system causes an expansion behavior and/or a contraction behavior, respectively, in the affected connection element. Moreover, in a preferred form, the selective heating and/or cooling activity provided by the control system is effective in inducing a change in the spatial relationship between the slide and the gib member associated therewith.

In one form, the control system further includes a fluid supply apparatus disposed in operative fluid communication with at least one connection element.

The control system, in another form, further includes a sensor to provide a measure of the spatial relationship between the gib and the slide; and a controller to control the heating process and/or cooling process operatively carried out by the control system, using the spatial measurement provided by the sensor. The spatial measurement provided by the sensor preferably defines a possible clearance between the gib and the slide.

In one form, each connection element comprises at least one of a bolt, a screw, and a tie rod nut combination.

The invention, in yet another form thereof, is directed to a method for use in a press machine having a slide, a gib, a frame, and a connection assembly including at least one connection element. The method comprises, in combination, the steps of providing a measure of the spatial relationship between the gib and the slide; and deforming at least one connection element, using the spatial measurement.

In one form, the deformation step further involves selectively heating and/or cooling the connection element specified for deformation. Even more specifically, the deformation step further includes the step of directing fluid against the connection element specified for deformation.

The invention, in yet another form thereof, is directed to a method for use in adjusting a clearance between a gib and a slide of a press machine having a frame. The method comprises, in combination, the steps of establishing a connection between the gib and the frame using at least one connection element; and deforming at least one connection element.

In one form, the method further includes the steps of determining the possible clearance between the gib and the slide; and controlling the deformation operation, according at least in part to the clearance determination.

The invention, in still yet another form thereof, is directed to a method for use in adjusting a clearance between a gib and a slide of a press machine having a frame. The method comprises, in combination, the steps of establishing a connection between the gib and the frame using at least one connection element; and selectively heating and/or cooling at least one connection element.

In one form, the selective heating and/or cooling step in relation to a specified connection element further includes the steps of directing fluid against the specified connection element.

The method, in one form, further involves determining the possible clearance between the gib and the slide; and controlling the selective heating and/or cooling operation, according at least in part to the clearance determination.

One advantage of the present invention is that the gib-slide clearance can be automatically adjusted across a full range of adjustment values, namely, a partial reduction to a complete reduction (i.e., a full close-out that eliminates the clearance).

Another advantage of the invention is that the adjustment mechanism provides the machine operator with the automated ability to counteract or otherwise compensate for the unwanted gib displacement that occurs in conjunction with the thermally-induced expansion of the crown and accompanying bowing of the upright.

Another advantage of the invention is that the deformable connection element enables precise and reproducible control of the gib-slide clearance adjustments due to the selective management of the actuating process, namely, regulated deformation (i.e., expansion or contraction) of the connection element via managed control of the heating and cooling processes.

A further advantage of the invention is that management of the gib-slide clearance can be placed under the direction of a fully automated, closed-loop feedback configuration, which in one form employs a sensor to monitor the gib-slide interface and a controller to direct the selective heating and/or cooling of the connection bolt to actuatively induce a corresponding movement of the gib.

A further advantage of the invention is that any mispositioning or dislocation of the gib members, originating from any cause or source, can be remedied by the adjustment mechanism.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
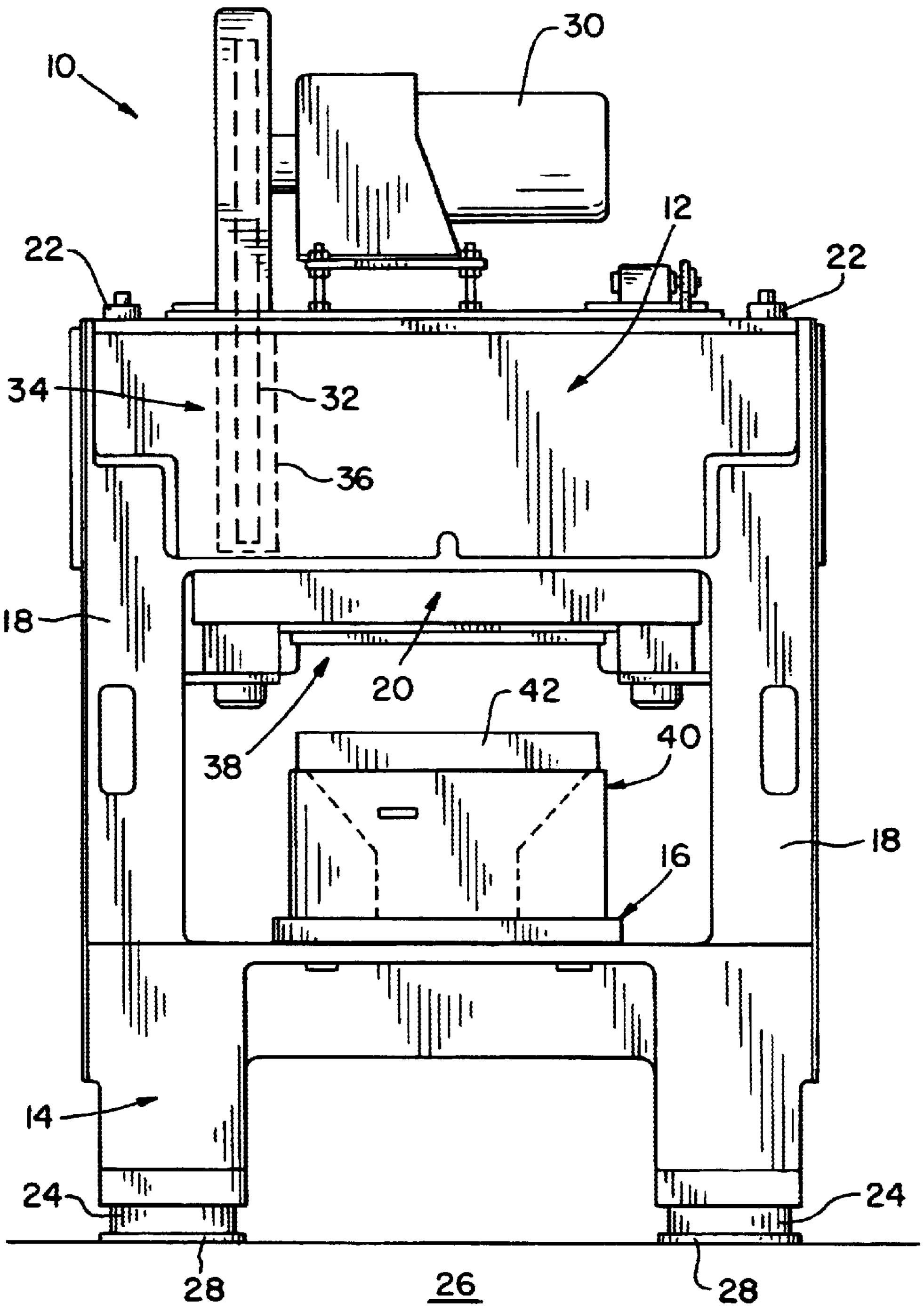
FIG. 1 is a front elevational view of a press machine in one illustrative form thereof incorporating the clearance adjustment assembly of the present invention.

The gib adjustment system of the present invention may be incorporated into machines of the mechanical press type discussed previously. Referring to FIG. 1, there is shown one such mechanical press 10 of conventional form including a crown portion 12, a bed portion 14 having a bolster assembly 16 connected thereto, and uprights 18 connecting crown portion 12 with bed portion 14. Uprights 18 are connected to or integral with the underside of crown 12 and the upper side of bed 14. A slide 20 is positioned between uprights 18 for controlled reciprocating movement between crown 12 and bed 14.

Press machine 10 further includes an upper die shoe (referenced generally at 38) attached in a conventional manner to the lower end of slide 20. The upper die shoe 38 preferably includes a die element (not shown) attached thereto. A lower die shoe 40 having a die element 42 coupled thereto is attached in a conventional manner to the upper end of bolster 16.

The upper and lower dies, as so arranged in their opposing spaced-apart relationship, cooperate in a known manner during press operation to process a workpiece disposed therebetween, e.g., mounted on the lower die element 42. The upper and lower dies together constitute a die set or assembly. A plurality of guide posts (not shown) may be disposed between the upper die shoe 38 and lower die shoe 40 in a known manner.

Tie rods (not shown), which extend through crown 12, uprights 18 and bed portion 14, are attached at each end with tie rod nuts 22. Leg members 24 are formed as an extension of bed 14 and are generally mounted on shop floor 26 by means of shock absorbing pads 28. A drive motor 30, which is part of the press drive mechanism, is attached by means of a belt 32 to an auxiliary flywheel (referenced generally at 34) attached to crown 12. Auxiliary flywheel 34 is connected by means of a belt (not shown) to the main flywheel of the clutch/brake combination (depicted generally at 36).

Although press 10 is shown in a press-down configuration, it could alternately be constructed in a press-up configuration by arranging the press in an upside-down fashion. In this form, slide 20 would be connected to the lower unit instead of the upper unit, i.e., crown 12. If slide 20 is connected to the lower unit in such alternate press-up configuration, the lower unit would constitute the crown portion.

The form of the press machine shown in FIG. 1 is provided for illustrative purposes only, and therefore should not be considered in limitation of the present invention, as it should be apparent to those skilled in the art that the principles of the present invention may be practiced with, and incorporated into, various other machine configurations, including machine environments other than press applications.

Figure 2A:
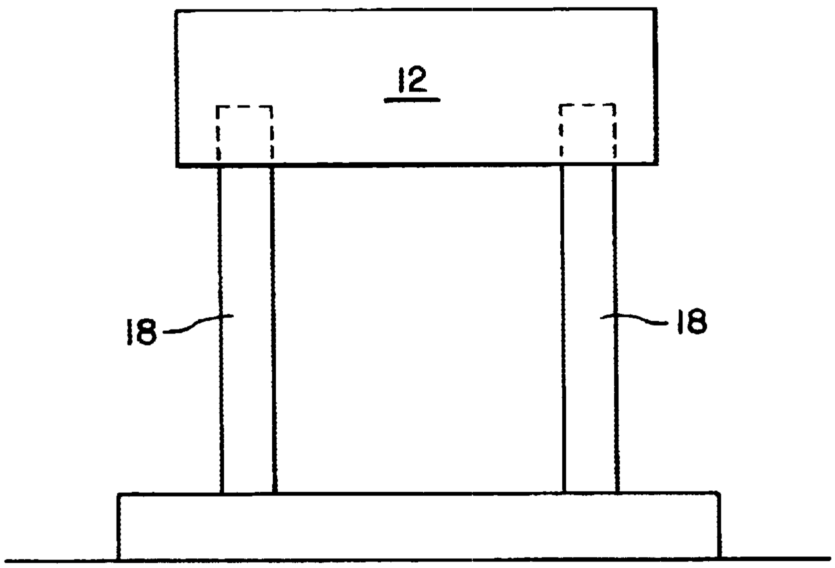
FIGS. 2A and 2B illustrate in exaggerated, front elevational view a partial schematic of two representative machine configurations that correspond to a normal frame condition (FIG. A) and a bent frame condition (FIG. 2B)
Figure 2B:
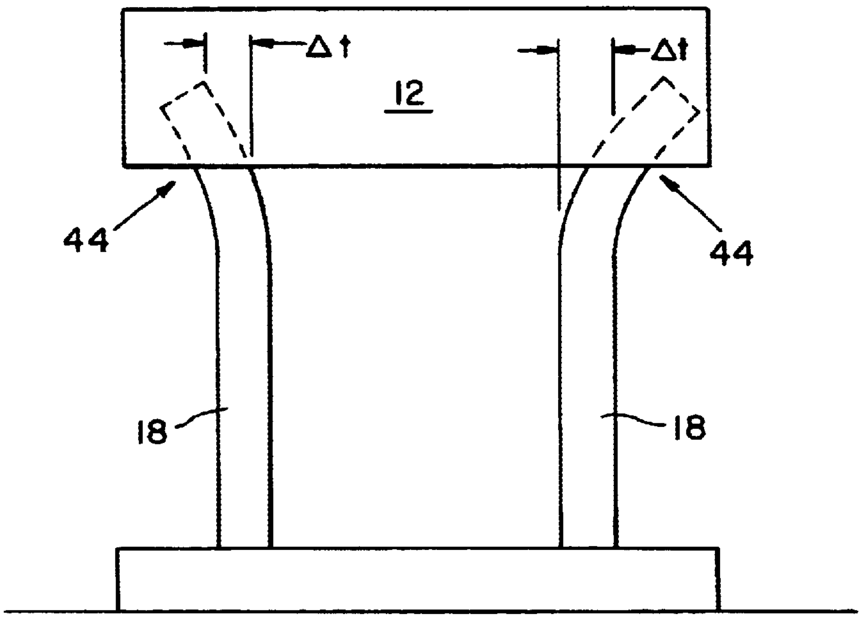

Reference is now made to FIG. 2 to discuss one of the problems addressed and overcome by the present invention. In particular, there is depicted a pair of machine configurations in exaggerated, partial schematic view to illustrate a normal frame arrangement (FIG. 2A) compared with a misaligned frame arrangement (FIG. 2B).

This misalignment or bending shown in FIG. 2B is attributable to thermal expansion of crown 12, which causes the upper portions 44 of the upright support members 18 to bow outwardly in the indicated manner. The effect of such bowing is to increase the clearance between the slide and the gib portion mounted to upright 18. The bowing feature is illustratively represented by a displacement "Δt" of upright support members 18 in the outward direction (i.e., lateral or side-to-side) from their normal vertical orientation depicted in FIG. 2A.

This increase in the gib-slide clearance is detrimental because the gib provides the primary bearing support in accurately locating and guiding the slide during its operative reciprocating movement. If this guiding facility is diminished or otherwise impaired by displacement of the gib, the slide will lose the stable bearing support needed to ensure that the slide maintains the desired path of reciprocation. Any misalignment in the slide could cause damage to the dies or improper processing of the workpiece.

The present invention addresses and solves this problem by providing a gib control system that modifies any gib-slide clearance by displacing the gib relative to the slide, preferably in the direction that enables the clearance to be selectively adjusted to effect a full or partial close-out of the clearance. This modification of the gib-slide clearance should be understood as encompassing the full range of possible adjustments, namely, the clearance may be eliminated (full close-out) or reduced (partial close-out) in a selective manner.

In the event of a partial close-out, the adjusted clearance is preferably selected to satisfy an allowable clearance criteria. A partial close-out could be advantageous in situations where some clearance is desired to accommodate the formation of a hydrodynamic and/or hydrostatic bearing therein (i.e., between the gib and slide), especially bearings of the type that continuously circulate hydraulic fluid through the bearing location.

One advantageous implementation of the present invention involves integrating the gib adjustment mechanism into a closed-loop control system in which clearance measurements provided by a sensor are used as feedback to a system controller to enable continuous, dynamic monitoring and control of the gib-slide clearance.

Figure 3:
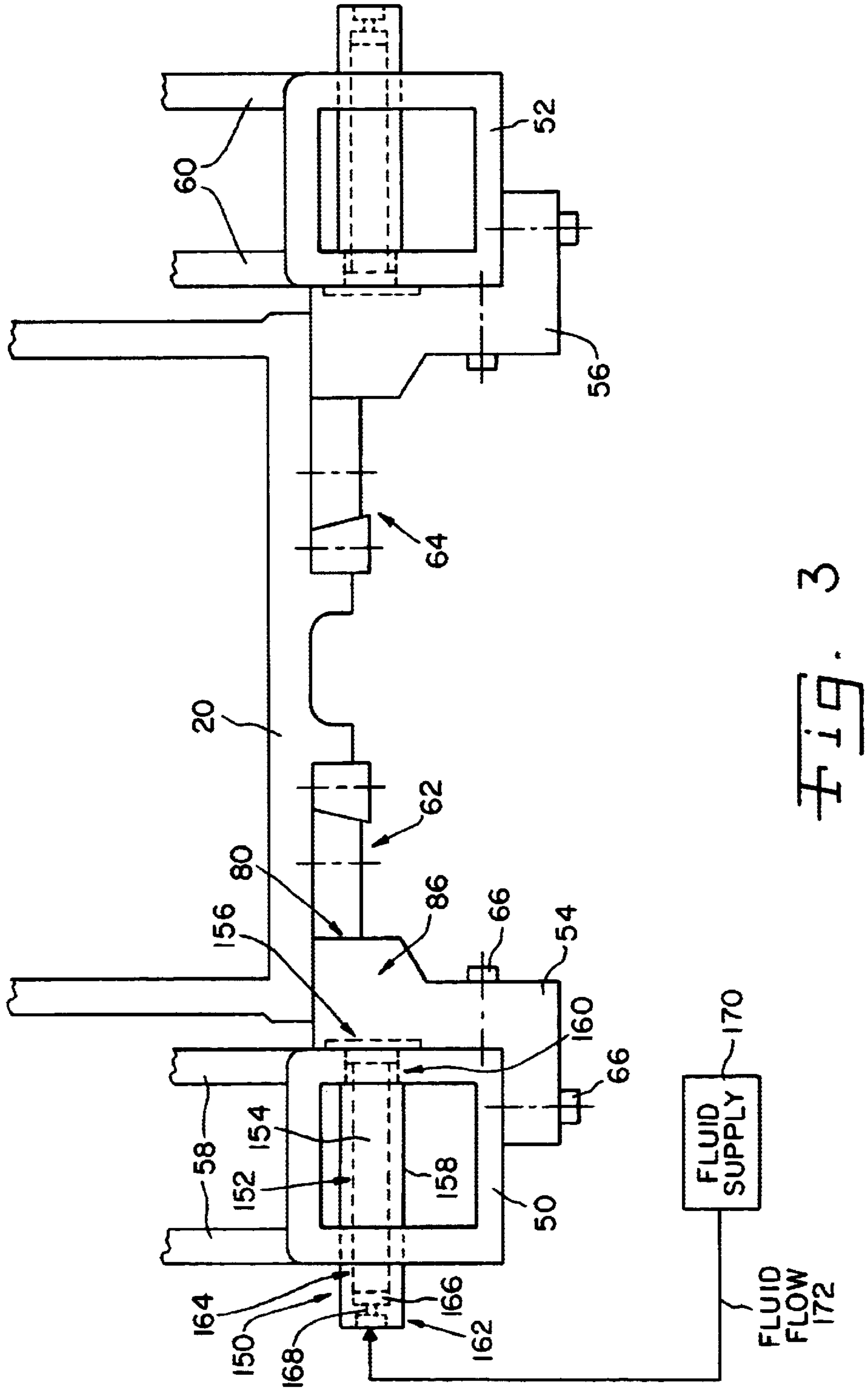
FIG. 3 is an upper, partial sectional view of a press frame configuration having a gib-upright connection assembly adapted for use with a heating and cooling apparatus, in accordance with one embodiment of the present invention.

Turning now to embodiments of the present invention, reference is first made to FIG. 3 which illustrates a partial sectional view taken atop the press machine that shows the cooperative arrangement between the frame components and the slide, and, in particular, the manner of adapting the frame-gib connection assembly to facilitate controlled actuative displacement of the gib, according to one embodiment of the present invention.

The illustrated machine arrangement conventionally includes slide 20, a pair of back-end upright support members 50 and 52, and a pair of gib members 54 and 56 each mounted to respective uprights 50, 52 at upper portions thereof and providing bearing support to slide 20 in a conventional manner. The uprights 50, 52 are respectively connected via suitable transverse cross-beams or reinforcing members 58, 60 to similar upright support members located at the front-end of the press machine. This arrangement provides a conventional four-post frame structure that in combination with the gib structures serves to support and guide slide 20.

The gib members 54 and 56 are typically coupled to slide 20 using respective coupling or connection members 62 and 64, although each gib member 54, 56 may be arranged to provide direct abutting engagement with an integral bearing surface of the body of slide 20. Gib member 54 is illustratively mounted to upright 50 using a set of mounting bolts 66, although it should be apparent that this mounting may occur by any suitable means.

As used herein, a gib should be understood as encompassing any structure, formation, or arrangement that is provided (in whole or in part) for purposes including, but not limited to, bearing support, alignment, positioning, locating, guiding, load support, and framing.

For purposes of brevity, and not in limitation, the discussion below pertaining to gib member 54 applies equally to gib member 56 and any other gib member installed in the machine environment that incorporates the principles of the present invention.

According to one embodiment of the present invention, the gib-upright location illustratively associated with gib 54 and upright 50 is adapted to include a connection assembly 150 configured to provide a connection between upright 50 and gib 54. This connection preferably secures gib 54 to upright 50 in a suitable mounting relationship, although connection assembly 150 may be provided in a form that simply establishes a connection between gib 54 and a stationary component, e.g., upright 50, without any further functionality or purpose.

The illustrated connection assembly 150 includes a bolt or other suitable connection mechanism 152 (shown in phantom) having a body portion 154 and an integral head portion 156. Bolt 152 is preferably provided according to a conventional design and construction. For example, bolt 152 may employ a typical design that implements body portion 154 in the form of an elongated, cylindrical shaft structure having a suitable threaded surface. However, this particular design should not be considered in limitation of the present invention, as it should be apparent that any suitable connection device and geometry can be used.

Additionally, the manner of mounting gib 54 to upright 50 using bolt 152 may employ any known process or configuration. For example, a threading engagement may be used to connect bolt 152 with upright 50, in which case upright 50 would be provided with suitable threaded portions to threadingly receive the complementary threaded surfaces of bolt 152. However, this manner of establishing the cooperative mounting or connective relationship between gib 54 and upright 50 should not be considered in limitation of the present invention, as it should be apparent that, any suitable manner for interconnecting the components may be used.

Although connection assembly 150 employs bolt 152, this implementation is merely illustrative and should not be considered in limitation of the present invention, as it should be apparent that any suitable connection device, component, member or element may be used. For example, connection assembly 150 may include, but is not limited to, a screw and a tie rod nut combination.

The illustrated connection assembly 150 further includes a receptacle, sleeve, or other suitable housing component 158 for receiving and housing bolt 152, according to one aspect of the present invention. In one form, housing 158 defines an elongated, generally cylindrical structure having a first proximal end 160, a second distal end 162, and a hollow cylindrical channel or interior space formed therebetween (referenced generally at 164) that is suitable to house bolt 152 when disposed therein.

The first housing end 160 is suitably adapted so that bolt 152 can be insertably received therethrough. The hollow housing space 164 is suitably dimensioned to enable an adequate placement of bolt 152 therein. For example, the hollow housing space 164 would be sufficiently long to accommodate the reception of bolt 152 when installed in a conventional mounting configuration, e.g., where the bolt head portion 156 is disposed in flush press-fit engagement with a corresponding surface of upright 50.

In one form, bolt 152 may constitute a pre-existing, standard connection piece that forms part of the regular construction and installation of the press machine. In this case, conventional means could be used to adapt the necessary press components to enable bolt 152 to be suitably integrated with housing 158 in order to form connection assembly 150. For example, the installed upright 50 could be readily machined (e.g., drilled) to create sufficient space about bolt 152 to receive and install housing 158. Any suitable means could then be used to secure housing 158 in its housing relationship to bolt 152.

Alternately, connection assembly 150 could be provided as a single modular unit that is installed as one piece into the press machine. For this purpose, the modular connection assembly 150 would be suitably adapted to facilitate its coupling relationship vis-à-vis connecting gib 54 and upright 50. For example, the outer surface of housing 158 could be threaded as needed to accommodate a threading engagement with relevant portions of upright 50.

The illustrated hollow axial channel 164 in housing 158 is preferably provided in a form enabling the formation of an end space or fluid chamber 166 defined between a bottom end surface of hollow channel 164 and a bottom end of bolt 152, as fully installed within housing 158. According to another aspect of the present invention, this fluid chamber 166 is arranged for fluid communication with a fluid supply 170 using a suitable fluid coupling and fluid conveyance means 168. For example, an illustrative fluid flow 172 provided by fluid supply 170 may be directed into fluid chamber 166 via a fluid transport means comprising a fluid line or channel formed in housing 158 at its distal end 162.

It should be apparent that any suitable means may be used to establish fluid communication between fluid supply 170 and bolt 152. Fluid chamber 166 is merely illustrative and should not be considered in limitation of the present invention, as it should be understood that fluid flow 172 generated by fluid supply 170 may be arranged for selective communication with bolt 152 at any location(s) or area of bolt 152.

For example, connection assembly 150 and fluid supply 170 can be suitably adapted to enable fluid to communicate with bolt 152 along the longitudinal surfaces of shaft portion 154. For this purpose, housing 158 may include radial fluid passageways arranged to enable fluid communication with hollow axial channel 164.

Additionally, as discussed further, bolt 152 is operatively exposed to a fluid flow for the purpose of inducing a desired deformation in bolt 152 that arises, for example, from a thermally-induced expansion and/or contraction. Bolt 152 experiences this deformation behavior in response to a heating or cooling activity, which is applied to bolt 152 by a suitable fluid flow contacting bolt 152. This hydraulic contact may selectively involve a partial or full immersion of bolt 152. For this purpose, connection assembly 150, and in particular housing 158, is adapted to provide adequate seal-proofing or other such fluid confinement means to contain fluid injected into the hollow axial channel 164.

In one implementation, fluid supply 170 constitutes in representative fashion an apparatus or other suitable means capable of selectively heating and/or cooling bolt 152. This functionality is generally representative of any process capable of subjecting bolt 152 to a thermal influence sufficient to alter, modify, or otherwise change the spatial profile of bolt 152. According to the present invention, this spatial variation is preferably sufficient to actuatively induce a displacement of gib 54. Moreover, this gib displacement is preferably in the direction that includes at least one dimension of any potential clearance between gib 54 and slide 20.

As used herein, the spatial profile of bolt 152 should be understood as encompassing, without limitation, the form, geometry, dimensions, and other similar features or characteristics of bolt 152. In a preferred form, the variation in the spatial profile of bolt 152 involves an elongation of bolt 152, namely, an increase in the longitudinal dimension of bolt shaft 154. This elongation, which occurs even thought bolt 152 is otherwise fixed in its mounting position relative to upright 50, acts concurrently to displace gib 54 to which it is firmly attached. As discussed further, thermal heating of bolt 152 produces the desired elongation.

As used herein, the deformation of bolt 152 should be understood as encompassing any change or variation in the spatial profile of bolt 152. This deformation includes, but is not limited to, an expansion or contraction of bolt 152. In one particular form, the expansion activity occurs as an elongation of bolt 152 along its longitudinal axis.

In a preferred form, the manner of constructing and configuring bolt 152 within the press machine environment is guided chiefly by the requirement that bolt 152 will be able to operatively actuate movement of gib 54 in a direction that enables adjustment of the relevant gib-slide clearance. More specifically, the position and orientation of bolt 152 vis-à-vis gib 54 is preferably chosen such that its longitudinal axis lies substantially parallel to the direction in which clearance adjustment is to take place. In this orientation, elongation of bolts 152 actuates a corresponding displacement of gib 54 along the direction of clearance reduction. This clearance adjustment is made necessary by the presence of a gap or space between gib 54 and slide 20 caused by thermal expansion of the press crown, for example.

Figure 4:
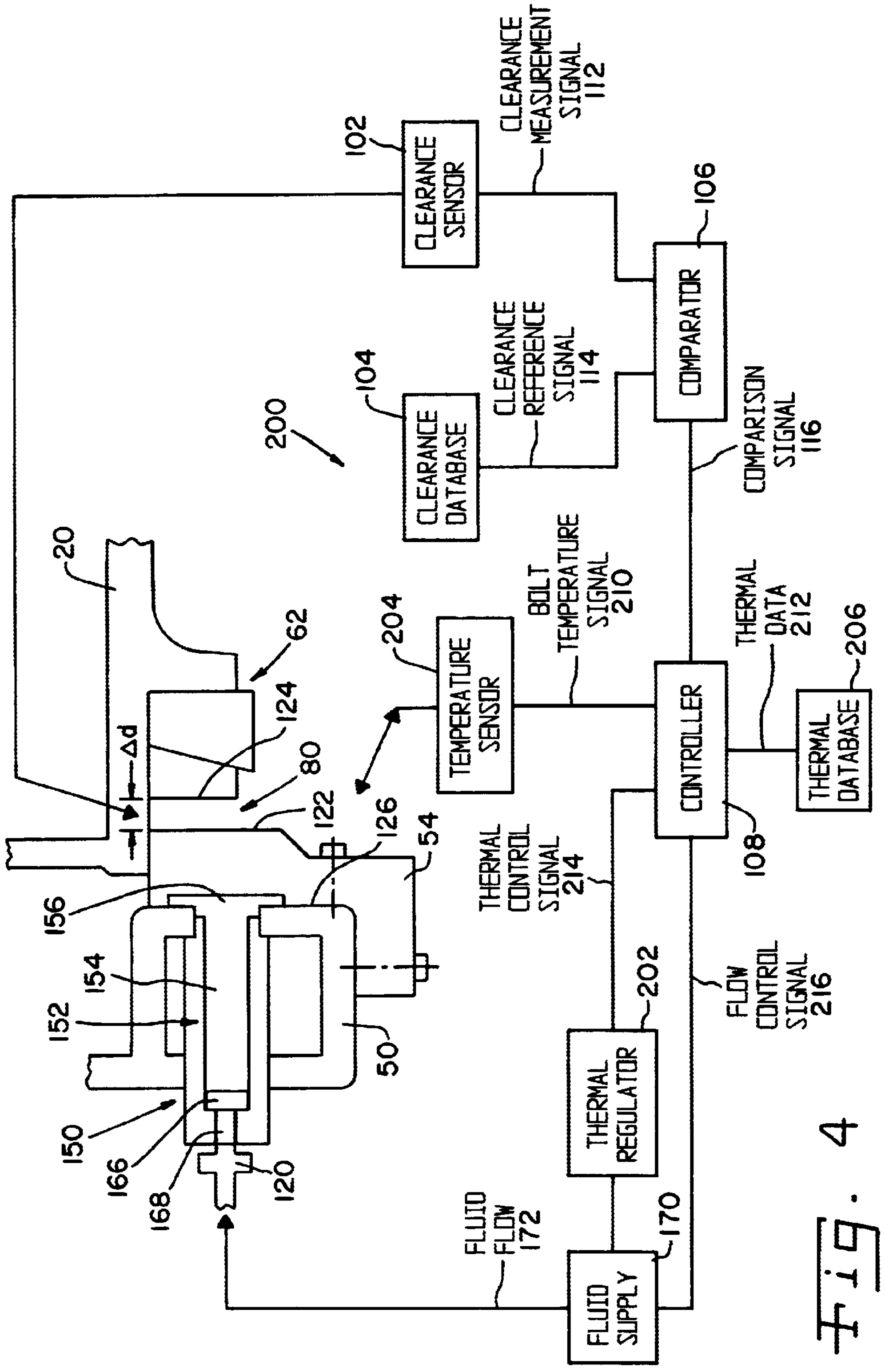
FIG. 4 is a partial cross-sectional schematic, partial block diagram for illustrating an automatic, closed-loop gib-slide clearance adjustment system, in accordance with another embodiment of the present invention.

For example, as discussed further in connection with FIG. 4, unwanted separation of gib 54 from slide 20 typically takes place at the interface illustratively referenced at 80. In FIG. 3, this interface 80 corresponds to the junction where gib 54 is engaged to slide 20 via connection member 62. In the press machine, this separation typically occurs along a lateral or side-to-side dimension that produces a clearance (not shown) between gib member 54 and slide 20 (i.e., at connection member 62).

Thus, bolt 152 is suitably placed so that its longitudinal axis is oriented substantially parallel to this separation direction. In FIG. 3, a typical gib-slide clearance would be created as the combination of upright 50 and gib 54 moves laterally (i.e., leftward) as upright 50 experiences a bowing activity in response to thermal variations affecting the attached press crown.

In brief, during one illustrative operation, bolt 152 is appropriately heated by directing a suitable fluid flow 172 from fluid supply 170 into housing chamber 166. Overall, the immersion of bolt 152 using fluid flow 172 is configured to at least cause bolt 152 to experience an axially-directed expansion. More particularly, in response to the fluid immersion, bolt 152 expands at least in the right-ward longitudinal direction (i.e., an elongation), which develops an actuated displacement of gib 54 relative to slide 20, namely, gib 54 moves towards slide 20. This movement of gib 54 consequently enables adjustment of the gib-slide clearance.

After completion of the gib-slide clearance adjustment, the thermal state of bolt 152 is maintained to ensure that the as-displaced gib 54 remains in its new orientation with slide 20. Further clearance adjustments can be made in the same manner via controlled changes in the spatial profile of bolt 152 using an appropriate thermal conditioning. A more detailed discussion is provided in connection with FIG. 4.

In various optional modes, the spatial profile of bolt 152 can be selectively modified to enable gib 54 to be displaced in a controlled manner sufficient to adjust the gib-slide clearance to a desired degree, i.e., a full close-out (namely, a reduction that eliminates the existing clearance) or a partial close-out (namely, a reduction that leaves a selective amount of clearance). For example, bolt 152 can be selectively heated to any number of suitable temperature levels each producing a corresponding elongation of bolt 152.

For purposes of accommodating variations in its spatial profile in response to the application of thermal energy thereto, bolt 152 may be specially adapted to include a directional-type deformation characteristic having a desired thermal sensitivity and directivity. For example, the dimensions, material construction, and/or fabrication processes of bolt 152 may be tailored or otherwise chosen with a view towards rendering bolt 152 with deformable properties in a desired direction. In particular, bolt 152 may exhibit a known or expected responsivity to variations in its thermal state, as manifested by a principal deformation activity along its longitudinal axis, i.e., an elongation.

Referring to the activity of gib displacement, the manner in which gib 54 undergoes or otherwise experiences such displacement can take various optional forms.

For example, in one form, the displacement of gib 54 relative to slide 20 may be provided by a tensile activity (e.g., elastic bending) occurring within gib 54. For this purpose, it is at least necessary to enable a portion of gib 54 to experience a tensile effect. For example, in FIG. 3, at least the portion of gib 54 through which the actuating force principally acts (indicated representatively at 86) should be provided in a manner that enables the activation of bolt 152 (e.g., elongation) to effectively induce a tensile effect in gib portion 86 sufficient to realize the desired clearance adjustment. Conventional manufacturing and fabrication processes can be utilized to form gib 54 with such a tensile-capable construction.

In general, such a gib portion 86 having tensile characteristics will overlap at least the dimensional axis along which clearance adjustment takes place. As shown, gib portion 86 is disposed between bolt 152 and slide connection member 62 along the direction of the gib-slide separation path. It should be apparent that this tensile effect may occur in whole or in part within gib 54, as needed, depending upon the extent to which gib 54 needs to be displaced to effect the clearance adjustment.

It is preferable that the tensile activity occurs as an elastic deformation of gib 54 such that gib 54 can be substantially restored to its original form or any one of various intermediate conditions, in the event that the thermal state of bolt 152 is appropriately changed (e.g., a contraction of the elongated bolt 152). This elasticity in the deformation of gib 54 may be needed, for example, when the bowing profile of upright 50 is eliminated or reduced, e.g., by cooling the crown.

In another optional form, gib 54 can be adapted to move in the absence of tensile activity, i.e., the gib movement is characterized by an intact, substantially rigid displacement in which substantially no gib deformation takes place. In this arrangement, gib 54 can be adapted to enable it to move in whole or in part under the influence of the actuating force developed using bolt 152. For example, if gib 54 is adapted to move as a unitary body, gib 54 would be slidably mounted on upright 50 in a manner enabling it to be slidably moved in the desired direction (e.g., side-to-side in FIG. 3).

Otherwise, a partial intact displacement of gib 54 could be accommodated by constructing gib 54 as a segmented assembly having an integrated arrangement of movable and stationary discrete gib elements. As a whole, the segmented gib assembly would move in unison with upright 50. The stationary gib elements would be fixedly secured to upright 50, while the movable gib elements would be slidably mounted to upright 50 or to a stationary gib element. One such movable gib element, for example, would encompass gib portion 86 in FIG. 3. The advantage this segmented approach offers is that deformation of the gib members can be avoided.

Of course, it should be understood that any combination of tensile-based and intact (i.e., non-deforming) displacement can be used with gib 54.

Although connection assembly 150 of FIG. 3 is shown in relationship to gib structures disposed at the upper ends of a pair of upright support members, this particular configuration is shown for illustrative purposes only and should not be considered in limitation of the present invention. Rather, it should be apparent that the actuation mechanism of the present invention (e.g., deformable connection bolt) can be integrated with any gib structure positioned at any location relative to the slide.

For example, if for some reason the gib-slide clearance dimension experiences unwanted variations at gib positions midway along the slide or even at the bottom of the slide path, the gib structures installed at these locations could be suitably adapted to incorporate the adjustment mechanism shown herein to enable adjustment of the corresponding clearance.

Although connection assembly 150 is illustratively associated with the gib members attached to the back-end uprights, it should be apparent that a similar connection assembly 150 could likewise be implemented with the gib members attached to the front-end uprights. This preferably results in an overall system configuration having a respective connection assembly dedicated to the corresponding upper gib member associated with each upright support member. In a four-post frame, there would then be two pairs of connection assemblies.

Additionally, any number of individual connection assemblies 150 may be used in tandem with a particular gib member. In this configuration, for example, the simultaneous elongation of plural connection bolts can produce an even larger actuating force in regards to causing movement of the relevant gib.

Moreover, as shown in FIG. 3, connection assembly 150 is typically implemented in corresponding pairs disposed at opposing sides of the slide. The reason is that the thermally-induced, bowing-related clearance variations which require correction typically occur in simultaneous fashion at opposing sides of the slide.

However, this opposing-side implementation should not be considered in limitation of the present invention, as it should be apparent that any number of such connection assemblies 150 (or other such actuators) may be provided to produce any configuration suitable for adjusting the gib-slide clearance(s). For this purpose, a control system would be provided to suitably coordinate in multi-tasking fashion the concurrent operation of all the connection assemblies.

Referring now to FIG. 4, there is shown a partial sectional schematic, partial diagrammatic view illustrating a control system 200 for use in combination with connection assembly 150 (FIG. 3) to direct and otherwise manage a gib-slide clearance adjustment process, according to another embodiment of the present invention.

For purposes of illustration, control system 200 is explained in connection with the gib-slide clearance adjustment mechanism discussed in relation to FIG. 3, namely, connection assembly 150 associated with gib 54. It should be apparent, however, that control system 200 can be adapted or otherwise used with any other such adjustment mechanism of the present invention.

The illustrated control system 200 comprises a sensor 102, a database 104, a comparator 106, a controller 108, and a fluid supply 170. In one form, the overall operation of control system 200 involves selectively adjusting the clearance between gib 54 and slide 20 in response to and in accordance with a measure of the gib-slide clearance. As shown, this clearance appears at the interface 80 between gib 54 and slide 20 and is indicated representatively by spatial separation distance "Δd".

Sensor 102 may be provided in the form of any device or apparatus suitable for measuring or otherwise determining a clearance present at a gib-slide interface of interest, e.g., interface 80. In one form, sensor 102 is implemented with a suitable transducer that detects any clearance at interface 80 (e.g., Δd) and generates a gib-slide clearance measurement signal 112 representative of this measurement.

Sensor 102 may be configured as a contact or non-contact type detector. Although only one sensor 102 is shown, it should be understood that any number of sensors may be positioned throughout the press machine environment to measure any number of clearance variations occurring at various gib-slide interface locations.

In one form of the invention, it is possible for the gib-slide clearance adjustment to selectively involve a complete reduction in the clearance (i.e., a full close-out) and/or a partial reduction in the clearance (i.e., a partial close-out). In the event of a partial close-out, it is preferable that the as-adjusted clearance meets allowable clearance criteria or threshold requirements defining the range of permissible clearance values.

For this purpose, database 104 is provided to include data representing permissible values for the clearance measurements. This clearance data can be provided in a form that correlates various gib-slide interface locations with corresponding allowable clearance measurements. In one form, database 104 includes a programmable memory for storing predetermined clearance data that can be updated as needed with new or revised data. Additionally, such clearance data could also be provided by any one of various input devices, enabling an operator to key in clearance data as control system 200 is operating. Database 104 generates a clearance reference signal 114 representative of the allowable clearance value for the current gib-slide interface 80 being monitored or otherwise under observation.

Comparator 106 compares the clearance measurement signal 112 (received from sensor 102) with the clearance reference signal 114 (received from database 104) and generates a comparison signal 116 representative of this comparison operation. For example, comparison signal 116 could be representative of the difference between the sensor clearance measurement and the allowable clearance value.

If the clearance measurement exceeds the allowable clearance, this event is indicative of an out-of-bounds condition requiring adjustment of the gib-slide clearance by at least the amount of the calculated difference therebetween (or more if desired). If the clearance measurement falls below the allowable clearance, this event is indicative of an in-bounds condition that would not require adjustment of the gib-slide clearance.

Comparator 106 may be provided in any of various forms such as a microprocessor, general purpose computer programmed to perform the indicated comparison operation, and a dedicated processor. It should be apparent that any suitable combination of hardware, software, and firmware may be used to implement comparator 106. Additionally, any other evaluation or analysis facility may be provided that is adapted to evaluate and/or analyze the gib-slide clearance measurements. In general, the illustrated components of control system 200 may be implemented with any combination of suitable analog and/or digital devices.

Controller 108 receives the comparison signal 116 from comparator 106 and generates control information in accordance therewith. In particular, the generated control information is suitable for use in controlling the selective heating and/or cooling of connection bolt 152.

More specifically, the control functionality implemented by controller 108 involves a determination of the type of deformation required of connection bolt 152 to effectuate the desired clearance adjustment, as represented by comparison signal 116. In particular, controller 108 must determine the mode of deformation (i.e., expansion or contraction), the magnitude of the deformation, and the corresponding change in the thermal state of connection bolt 152 that is needed to effectuate the requested deformation behavior.

For example, in order to induce a displacement of gib 54 that fully closes the illustrative gib-slide separation gap Δd, controller 108 may determine that suitable heating of bolt 152 will produce an elongation of bolt 152 in the direction of the clearance close-out dimension, so as to actuate movement of gib 54 in the same direction. In this example, controller 108 includes a functionality that determines the amount of heating needed (and the areas of thermal application vis-à-vis bolt 152) to induce the specified expansion in bolt 152 (i.e., longitudinal elongation). The amount of heating could be represented by a temperature variation in bolt 152. Other parameters under the control of controller 108 may include, but are not limited to, the duration of heating/cooling.

Controller 108 is preferably configured with thermal regulator 202, optional temperature sensor 204, and thermal database 206. Temperature sensor 204 may be provided in the form of a transducer or other suitable means disposed in temperature sensing relationship to connection bolt 152 and capable of determining the temperature of connection bolt 152. Temperature sensor 204 provides a bolt temperature signal 210 to controller 108 representative of the temperature of bolt 152.

The illustrated thermal database 206 includes thermal response or behavior profiles representing the expansion and contraction characteristics of various bolt types and geometries as a function of temperature change. For example, regarding illustrative bolt 152, database 206 would include information that identifies the amount of longitudinal elongation that can be expected depending upon the temperature of bolt 152 relative to a baseline or reference temperature level (i.e., ambient temperature).

This correlation of spatial information (e.g., longitudinal dimension) to bolt temperature may be compiled or otherwise obtained using any suitable means, such as thermal analysis software that makes calculated predictions and/or projections regarding the thermal responsivity and empirical data based on experimental activity, for example. Similar thermal profile information may be provided for connection mechanisms other than bolts.

The illustrated thermal regulator 202 is generally representative of any apparatus or other suitable device enabling controlled heating and/or cooling of a target fluid, such as may be generated by fluid supply 170. For example, thermal regulator 202 may be provided in the form of a conventional energy applicator that is adapted for use with fluid supply 170 to heat the fluid flow. Additionally, thermal regulator 202 may include a cooling mechanism such as a refrigerant-type condenser that is adapted for use with fluid supply 170 to cool the fluid flow. Thermal regulator 202 preferably is adapted to selectively perform both the heating and cooling functions.

The illustrated fluid supply 170 is generally representative of any apparatus capable of selectively generating a hydraulic fluid flow. For example, fluid supply 170 may include a conventional arrangement comprising a source of hydraulic fluid, a variable hydraulic pump, and a controllable valve assembly cooperating with the pump to regulate the pressurizing flow of hydraulic fluid.

Fluid supply 170 is specifically adapted for use in facilitating the selective heating and/or cooling of bolt 152. In particular, fluid supply 170 is adapted in any conventional manner for fluid communication with connection bolt 152 via fluid line 168 and fluid chamber 166 using any suitable coupling mechanism 120. Fluid supply 170 would clearly be adapted to both inject fluid into and remove fluid from housing 158.

Controller 108 directs the operation of thermal regulator 202 and fluid supply 170 in regard to providing the appropriate heating and/or cooling activity affecting bolt 152, based upon comparison signal 116. In particular, controller 108 facilitates the execution of a clearance adjustment operation which at least modifies the gib-slide separation so that the resulting clearance meets a permissible value. If the clearance measurement is acceptable, no clearance adjustment is necessary. The clearance adjustment operation takes place as follows.

Upon receiving comparison signal 116 that indicates, for example, that the current clearance measurement exceeds an allowable clearance value, controller 108 determines the type of bolt deformation that is needed. In this example, elongation of bolt 152 via thermal expansion would be suitable to accomplish the desired clearance adjustment.

Controller 108 obtains a measure of the current temperature of bolt 152 from bolt temperature signal 210 provided by temperature sensor 204. Controller 108 accesses and retrieves from thermal database 206 thermal information 212 indicating the temperature level and/or temperature variation needed to implement the bolt elongation that will produce the desired clearance adjustment via actuated displacement of gib 54.

Controller 108 suitably processes comparison signal 116, bolt temperature signal 210, and thermal data 212 and generates a suitable thermal control signal 214 applied to thermal regulator 202 and a flow control signal 216 applied to fluid supply 170. The thermal control signal 214 directs thermal regulator 202 to thermally process the fluid provided by fluid supply 170 in a manner indicated by control signal 214.

For example, thermal control signal 214 may direct thermal regulator 202 to heat the temperature of the fluid to a certain temperature, which corresponds to a thermal level that controller 108 previously determined would produce the desired bolt elongation and subsequent clearance adjustment. The flow control signal 216 directs fluid supply 170 to generate a hydraulic flow having a selective flow rate.

A similar process would be undertaken by control system 200 to effectuate other deformation behaviors in bolt 152. For example, if the specified clearance adjustment can be carried out using a contraction of bolt 152 (i.e., compression or reduction in the longitudinal dimension), control system 200 may implement this operation by cooling bolt 152. For this purpose, controller 108 would suitably direct the operation of thermal regulator 202 and fluid supply 170 to develop a fluid flow 172 sufficient to perform the desired cooling operation on bolt 152. Such a cooling operation would utilize information from thermal database 206 and temperature sensor 204 in a manner similar to that used to execute the heating operation discussed previously.

In certain forms of the invention, a full clearance close-out may be deemed the most acceptable option for establishing the steady-state spatial relationship between slide 20 and gib 54. In this case, the allowable clearance values stored in database 104 will be set to zero (0), so that comparison signal 116 embodies a representation of the detected spatial separation $\Delta d$. Alternately, control system 200 may be provided in a form that eliminates or avoids the comparison operation, instead being adapted to simply transmit clearance measurement signal 112 to controller 108.

In one form of control system 200, the functionality of controller 108 and comparator 106 may be integrated together using a programmable logic controller (PLC). The PLC would be suitably programmed in a known manner to contain the control sequence adequate for producing the proper control signals in response to the evaluation of the clearance measurements.

The illustrated control system 200 is preferably implemented in the form of a dynamic, closed-loop feedback configuration for continuously monitoring, evaluating, and adjusting the gib-slide clearance. The detected clearance measurements would serve as feedback signals (i.e., inputs into system 200) that are processed and used to generate the indicated hydraulic flow and thermal regulator control signals (i.e., outputs from system 200). This feedback configuration preferably functions in a fully automated fashion, enabling the gib-slide clearances to be adjusted automatically upon the occurrence and subsequent detection and analysis of such clearances.

Control system 200 can operate at any time and for any duration, but finds particular use during press machine operation, e.g., when a workpiece is being processed during a press running cycle. Control system 200 can be adapted to selectively monitor the clearance (i.e., obtain clearance measurements) at specified intervals, although the monitoring operation preferably runs continuously.

Control system 200 can optionally include a display or other suitable notification apparatus (not shown) that reports the clearance measurements and comparison results to the operator. Additionally, an interrupt mechanism (not shown) can be provided that deactivates, disables, or suspends machine operation in the event that the clearance measurement exceeds an alarm threshold indicating the onset or occurrence of a failure condition necessitating immediate termination of the press cycle.

During operation, in reference to the gib-slide separation condition shown in FIG. 4, sensor 102 detects the presence of gib-slide clearance "Δd" and generates signal 112 representative thereof. This clearance measurement (as represented by signal 112) is then evaluated, i.e., it is compared by comparator 106 to an allowable clearance value (from database 104) pertaining to gib-slide interface 80. For purposes of illustration, and not in limitation, it is assumed that a full clearance close-out is desired, i.e., the allowable clearance is zero (0) as supplied by database 104.

Controller 108 generates control signals 214 and 216 based upon an evaluation of comparison signal 116 and the other controller inputs, namely, thermal data 212 and temperature signal 210. Control signals 214 and 216 represent a command instruction set that will be effective in facilitating a full close-out of the existing gib-slide clearance.

In particular, thermal control signal 214 directs thermal regulator 202 to heat the fluid in fluid supply 170 to produce a hydraulic fluid flow 172 that raises the temperature of bolt 152 to a level sufficient to accomplish the desired clearance adjustment. As noted previously, this heating activity causes bolt 152 to expand in the longitudinal direction (i.e., an elongation), thereby actuating movement of the attached gib 54.

More specifically, as bolt 152 elongates in the axial direction (i.e., right-ward in FIG. 4), the accompanying actuated displacement of gib 54 continues until gib surface portion 122 abuttingly engages with slide surface portion 124 which is disposed in facing opposition thereto across the gap or clearance Δd. The thermal state of bolt 152 is thereafter maintained to hold gib 54 in its new closed-out orientation relative to slide 20.

For gib configurations where the gib members are fixedly mounted to upright 50, one consequence of displacing gib 54 in the indicated manner is that a gap, clearance or other such interstitial space typically appears along at least a portion of the interface 126 between gib 54 and upright 50. In the absence of any such gib displacement that accompanies adjustment of the gib-slide clearance, this gib-upright interface 126 is otherwise defined by a firm surface-to-surface abutting contact between respective portions of gib 54 and upright 50.

Although the present invention has been shown and described in conjunction with a mechanical press, this implementation should not be considered in limitation of the present invention as it should be apparent that the gib adjustment system has general applicability to other machine environments and industrial settings.

Additionally, although the present invention addresses the particular problem associated with the bowing activity experienced by the uprights, the present invention may clearly be used to facilitate modification of the gib-slide clearance regardless of the cause or manner in which such clearance became present.

Additionally, although the present invention is depicted in a configuration where the gib is displaced relative to the slide to effect adjustment of the clearance therebetween, it should be understood that the present invention may be extended to other uses involving adjustment of the clearance between the gib and any other machine component, whether stationary or movable.

Additionally, even though deformation of the illustrated connection mechanism (e.g., bolt) is used to make clearance adjustments in the lateral direction, this should not be considered a limiting feature of the present invention. Rather, it should be apparent that the connection bolt (and any other suitable actuator mechanisms) may be suitably configured to enable gib-slide clearance adjustments to be made in any direction, e.g., longitudinal (up-and-down), lateral (side-to-side), transverse (front-to-back), cross-wise, and diagonal. In general, a gib-slide clearance adjustment can be made anywhere that a gib member is used.

Furthermore, although the present invention has been directed to a mechanism for selectively displacing a gib, this feature is simply illustrative and should not be considered in limitation of the present invention, as it should be apparent that the adjustment mechanism may be readily adapted for use in actuating the movement of parts and components other than a gib. For example, other structures that may be adapted for movement may include, but are not limited to, support structures, bearing members, frame elements, and other similar arrangements that serve to position, locate, guide, support, frame, and align.

Additionally, although the embodiments of the present invention have used a connection bolt as the preferred actuating mechanism to effect displacement of the gib, the invention is not so limited but should be considered as broadly encompassing any suitable actuator apparatus having deformable properties that can be adapted for use in selectively displacing a certain machine element.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for use in conjunction with a press machine, said press machine comprising a slide, a gib, and a frame, said apparatus comprising:

a connection assembly comprising at least one connection mechanism, each connection mechanism configured for providing a connection between said gib and said frame; and a module to selectively at least one of heat and cool at least a portion of at least one said connection mechanism.

2. The apparatus as recited in claim 1, wherein at least one said connection mechanism comprises at least one of a bolt, a screw, and a tie rod nut combination.

3. The apparatus as recited in claim 1, wherein at least one said connection mechanism has a thermally-sensitive deformation characteristic enabling the respective connection mechanism to exhibit at least one of expansion and contraction, the expansion being in response to a heating influence and the contraction being in response to a cooling.

4. The apparatus as recited in claim 1, wherein said module further comprises:

a fluid supply apparatus disposed in operative fluid communication with at least one said connection mechanism.

5. The apparatus as recited in claim 1, further comprises:

a sensor to provide a measure of the spatial relationship between said gib and said slide; and a controller operatively connected to said sensor and operatively connected to said module.

6. The apparatus as recited in claim 5, wherein said connection assembly, said module, said sensor, and said controller cooperatively defining a feedback configuration.

7. The apparatus as recited in claim 1, wherein said frame comprises at least one upright support member.

8. A system for use in conjunction with a press machine, said press machine comprising a slide, a gib, and a frame, said system comprising:

a connection assembly comprising at least one connection element, each connection element configured for providing a connection between said gib and said frame; and a control system operatively associated with said connection assembly, said control system being adapted to selectively induce the deformation of at least one said connection element.

9. The system as recited in claim 8, wherein the selective deformation activity involving said connection assembly being suitable to effectuate a selective change in the spatial relationship between said gib and said slide.

10. The system as recited in claim 8, wherein said frame comprises at least one upright support member and said gib comprises at least one gib member, each said connection element being configured for association with a respective gib member and a respective upright support member in such a manner so as to provide a connection therebetween.

11. The system as recited in claim 8, wherein said control system further comprises:

a fluid supply apparatus disposed in operative fluid communication with at least one said connection element.

12. The system as recited in claim 8, wherein at least one said connection element comprises at least one of a bolt, a screw, and a tie rod nut combination.

13. The system as recited in claim 8, wherein said control system further comprises:

an apparatus to selectively at least one of heat and cool at least a portion of at least one connection element.

14. The system as recited in claim 13, wherein said control system further comprises:

a sensor configured to provide a measure of a spatial relationship between said gib and another element of said press machine; and a controller to control the operation of said apparatus, using the spatial measurement provided by said sensor.

15. The system as recited in claim 14, wherein the spatial measurement provided by said sensor being capable of defining a possible clearance between said gib and said slide.

16. The system as recited in claim 8, wherein the deformation activity involving said connection assembly occurring in response to the influence of a thermal treatment process being carried out under the direction of said control system.

17. A press, comprising:

a crown and a bed;

a movable slide disposed for operative movement in opposed relation to said bed;

a frame to guide operative movement of said slide;

a gib assembly, said gib assembly comprising at least one gib member;

a connection assembly comprising at least one connection element, each said connection element providing a connection between said frame and a respective gib member; and a control system, said control system being configured to selectively at least one of heat and cool at least a portion of at least one said connection element.

18. The press as recited in claim 17, wherein the selective at least one of heating and cooling activity provided by said control system in relation to an affected said connection element being effective in causing an expansion behavior and/or a contraction behavior, respectively, in the affected connection element.

19. The press as recited in claim 17, wherein the selective at least one heating and cooling activity provided by said control system in relation to an affected connection element being effective in inducing a change in the spatial relationship between said slide and the gib member associated therewith.

20. The press as recited in claim 17, wherein said control system further comprises:

a fluid supply apparatus disposed in operative fluid communication with at least one said connection element.

21. The press as recited in claim 17, wherein at least one said connection element comprises at least one of a bolt, a screw, and a tie rod nut combination.

22. The press as recited in claim 17, wherein said control system further comprises:

a sensor to provide a measure of the spatial relationship between said gib and said slide; and a controller to control the at least one of heating process and cooling process operatively carried out by said control system, using the spatial measurement provided by said sensor.

23. The press as recited in claim 22, wherein the spatial measurement provided by said sensor being capable of defining a possible clearance between said gib and said slide.

24. A method for use in conjunction with a press machine, said press machine including a slide, a gib, a frame, and a connection assembly, said connection assembly including at least one connection element, said method comprising the steps of:

providing a measure of the spatial relationship between said gib and said slide; and deforming said at least one connection element, using the spatial measurement in determining an extent to which said at least one connection element is to be deformed.

25. The method as recited in claim 24, wherein the deformation step further includes the steps of:

selectively at least one of heating and cooling the connection element specified for deformation.

26. The method as recited in claim 24, wherein the deformation step further includes the steps of:

directing fluid against the connection element specified for deformation.

27. A method for use in adjusting a clearance between a gib and a slide of a press machine, said press machine including a frame, said method comprising the steps of:

establishing a connection between said gib and said frame using at least one connection element; and deforming said at least one connection element in a controlled manner so as to thereby adjust the clearance between said gib and said slide.

28. The method as recited in claim 27, further includes the steps of:

determining the possible clearance between said gib and said slide; and controlling the deformation operation based upon at least one parameter, the clearance determination being one said parameter used in said controlling step.

29. A method for use in adjusting a clearance between a gib and a slide of a press machine, said press machine including a frame, said method comprising the steps of:

establishing a connection between said gib and said frame using at least one connection element; and selectively at least one of heating and cooling said at least one connection element.

30. The method as recited in claim 29, wherein the selective at least one of heating and cooling step in relation to a specified connection element further includes the step of:

directing fluid against a specified said connection element.

31. The method as recited in claim 29, further includes the steps of:

determining the possible clearance between said gib and said slide; and controlling the selective at least one of heating and cooling operation based upon at least one parameter, the clearance determination being at least one parameter used in said controlling step.

* * * * *